Figure 1:
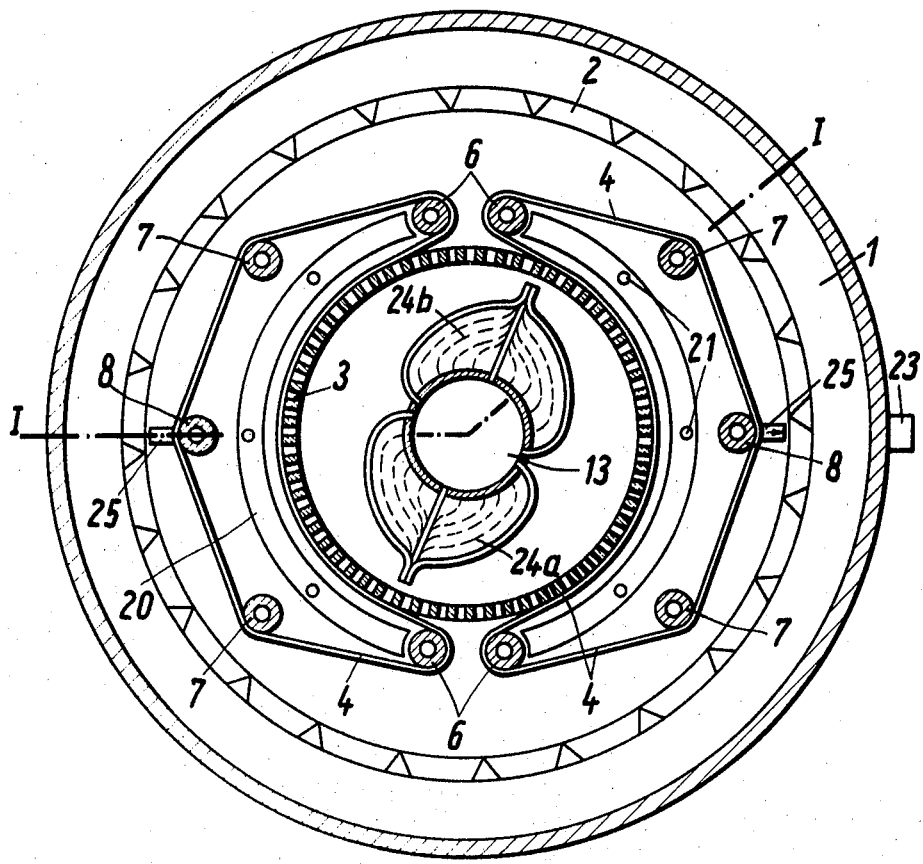

United States Patent

Von Rotel

[15] 3,661,266

[45] May 9, 1972

[54] FILTER BELT CENTRIFUGE

[72] Inventor: Julius Von Rotel, Dortmund-Wambel, Germany

[73] Assignee: Reineveld N.V., Delft, Netherlands

[22] Filed: Oct. 26, 1970

[21] Appl. No.: 83,744

[30] Foreign Application Priority Data

Nov. 4, 1969 Germany...................P 19 55 274.0

[52] U.S. Cl. .........................................210/370, 210/DIG. 4
[51] Int. Cl. .............................................................B04b 3/08
[58] Field of Search........................210/DIG. 4, 370, 385, 78

[56] References Cited

UNITED STATES PATENTS

| | | | |
|---|---|---|---|
| 3,178,027 | 4/1965 | Von Rotel ............................210/370 |
| 3,273,718 | 9/1966 | Riethmann et al.....................210/370 |

FOREIGN PATENTS OR APPLICATIONS 598,683   10/1959   Italy.......................................210/370

Primary Examiner—Jim L. De Cesare
Attorney—Pierce, Scheffler & Parker

[57] ABSTRACT

A filter belt centrifuge comprising filter belts moving in a rapidly rotating cage, said belts being tensioned by rollers and driven at their inner pass contacting the outer surface of a drive drum. The perforated drive drum is centrically positioned within the cage and rotates with slightly different speed of rotation. The filter belts are tensioned with constant force and in proportion to the generated centrifugal force by tension rollers acting on the inner surface of the outer belt pass.

A distribution pot or cylinder having a pair of conical sections supplies the material to be filtered in two vertical planes onto the width of the filter belts uniformly distributed thereon by means of tubes attached to its major diameter.

11 Claims, 2 Drawing Figures

FILTER BELT CENTRIFUGE

PRIOR ART

There are already known a plurality of proposals for filter belts running within rotating bodies. However, until the present time it has not been possible to overcome the manifold difficulties arising in filter belt centrifuges of this type so that filter belt centrifuges are practically not in use. The evident advantage of using a filter belt running within the field of centrifugal action resulted in numerous constructions, however, it is a fact that no filter centrifuges are on the market. This fact is due to the particular difficulties involved in the movement of a filter belt within the centrifugal field, and, furthermore, to the extraordinarily difficult problem of uniformly distributing the material to be filtered onto the filter belt and of discharging the filter phases in orderly separated condition.

Several filter belt centrifuges had been proposed which on principle were supposed to operate in such manner that the inner surface of an endless filter belt charged with the material to be filtered was inverted to the outer side by means of a deflection roller in order to throw off the dry filter material. Therefore, the filter belt, in its rotation with the drum of the centrifuges, was given an additional rotary movement over the deflection rollers. In one such proposed construction, the deflection roller was driven by a chain. However, due to the fact that the belt was wet, the frictional forces were so low that no rotary movement of the filter belt resulted.

In the filter web centrifuge disclosed in German Pat. No. 1,063,531, the filter belt is passed over a circular arc shaped, perforated cylinder segment, and the space between the inner and the outer passes of the belt accommodates the liquid draining device. Deflection rollers or pulleys are positioned on both sides. The inner pass firmly contacts the perforated cylinder segment and is to be moved, in addition to the motion of the centrifuge, by means of driving pulleys provided at the upper and lower margins or edges of the filter belt and having the diameter of the inner belt pass. However, as the filter belt is forcefully urged against the inner perforated sheet metal plate of the cylinder segment by centrifugal forces, the pair of frictional pulleys are not capable of imparting an additional movement to the belt.

Even if movement were forced, for example, by means of toothed pulleys and gear chains attached to the filter belt, the belt would, in a very short period of time, be worn because it is subject under the centrifugal pressure to great wear on the perforated sheet metal plate.

Furthermore, from German Pats. Nos. 1,147,173 and 1,098,872, there are known filter belt centrigutes wherein the relative belt movement is effected by means of a roller cage, having loosely mounted deflection rollers, in combination with a relative movement of the drum of the centrifuge. Thereby, the outer belt pass under the action of the centrifugal force intimately contacts the perforated inner shell of the centrifuge drum, while the inner belt pass is guided over rollers of pulleys. However, due to the fact that the material to be filtered is charged onto the outer belt pass there arises the problem of transferring the dry filtering material from the inner surface of the outer belt pass through the filter belt moving inwardly at the deflection roller or pulley, in opposition to the centrifugal force.

In the case of the filter web centrifuge disclosed in German Pat. No. 1,147,173, one of the deflection rollers or pulleys is constructed as a bucket wheel having a hollow shaft. The solid material should be transported initially in opposition to the centrifugal force into the interior of the machine, and then transferred through the cells or buckets of the hollow shaft. However, if the bucket wheel and the hollow shaft are really permeable to the solid material, then such material, due to the higher centrifugal force, is thrown out again at the other side of the bucket wheel and is again transferred to the outer belt pass. Even if it were actually possible to convey the solid material into the hollow shaft, there would result the problem of transporting the solid material — subjected to high centrifugal pressure — into the outer space.

In the case of the filter web centrifuge according to German Pat. No. 1,098,872, the problem of passing the solid material from the outer belt pass to the outer side is solved in that a chamber belt is inserted between the deflection roller or pulley and the charged filter belt, which chamber belt encloses the solids cake in chambers and then transports it with the filter belt in an inward direction, in opposition to the centrifugal force, to a deflection roller or pulley for the chamber belt itself, where the chambers are opened again so that the solid material may be propelled from the filter belt. However, apart from the mechanically expensive structure, the solid material then must be caught by a chute inclined by about 40°, which chute must extend from the bottom of the roller cage to a point over the upper edge of the rolling drum and which can be secured to the bottom of the roller cage only.

OBJECT OF THE INVENTION

It is an object of the present invention to provide a filter belt centrifuge which avoids the disadvantages of the prior art; which is safe in operation and inexpensive; wherein the filter belts no longer slide on stationary parts; which is not interfered with by non-uniform feed of the material to be filtered; and which is capable of proper operation, especially even with high speeds of rotation.

Another object of the invention is to provide a distribution cylinder adapted uniformly to charge the material to be filtered over the width of the filter belts, and adapted to compensate for sudden variations in the amount of charged material.

A further inventive object is to provide means enabling the filter belts to be driven in simple manner and free from slip, whereby the power transmission is independent of the belt tension, as well as means for tensioning the filter belts, independent from their elongation or stretch, in uniform manner and, additionally, in proportion to the generated centrifugal force.

In particular, the filter belt centrifuge according to the invention separates particles of smallest size from highly viscous masses; it endures maximum speeds of rotation and accelerations; as well as permits a ready discharge and simple charging of the material to be filtered.

THE INVENTION

The filter belt centrifuge according to the invention comprises, in particular, a rapidly rotating cage wherein the filter belt runs; a driving drum for the filter belt through which the material to be filtered is fed; means for tensioning the filter belt even in case of length variations thereof; means advantageously tensioning the filter belt also in proportion to the generated centrifugal force; and a distribution cylinder for uniformly feeding the material to be filtered over the whole width of the belt.

In detail, the filter belt centrifuge according to the invention includes a perforated driving drum which is driven at a speed of rotation different from that of the roller cage, permitting passage of the material to be filtered and centrally positioned within the roller cage, which driving drum is contacted by the inner pass of each of the filter webs over almost its entire length for moving the filter belt, into which driving drum the material to be filtered is charged by the distribution cylinder in two vertical planes onto the filter belts or onto their inner passes, respectively, at a point leading in the direction of rotation; receiver or collector plates for collecting the filtering liquid on the inner surface of the inner pass of the filter belts; a casing surrounding the cage and collector means within such casing for collecting and discharging the filter cake which has been thrown off from the filter belts during inversion of the filter belts.

Belt tensioning is effected by deflection, guiding and tensioning rollers or pulleys in combination with the driving drum, whereby the tensioning rollers — which are movable outwardly and inwardly in radial direction — are urged outwardly with constant force by a spring, and wherein, moreover, the respectively generated centrifugal force acts upon the tensioning rollers and tensions the belt in proportion to the respectively existing centrifugal force.

The distribution tubes or pipes for distributing the material to be filtered over the entire width of the filter belt are attached with the inner ends thereof around the major diameter of the distribution cylinder, and their outer ends terminate in a pair of vertical, opposite planes shortly in front of the driving drum. In order to ensure proper slip of the material to be filtered through the distribution tubes, the projection of the tubes on a horizontal plane always forms an angle of more than 90° with the radius of a circle intersecting such tubes and centrically positioned relative to the distribution cylinder.

As the gear transmission for driving the filter belt centrifuge there preferably is used a "Cyclo" transmission permitting the driving drum to rotate at a slightly higher speed of rotation than that of the roller cage. To this end, the actual driving axis of the "Cyclo" transmission is held stationary and the housing is rotated at high speed of rotation. The output axes which are concentrically one within the other, then rotate with a certain differential speed which may be varied by driving the actual driving or input axis with a specific speed of rotation.

Figure 2:
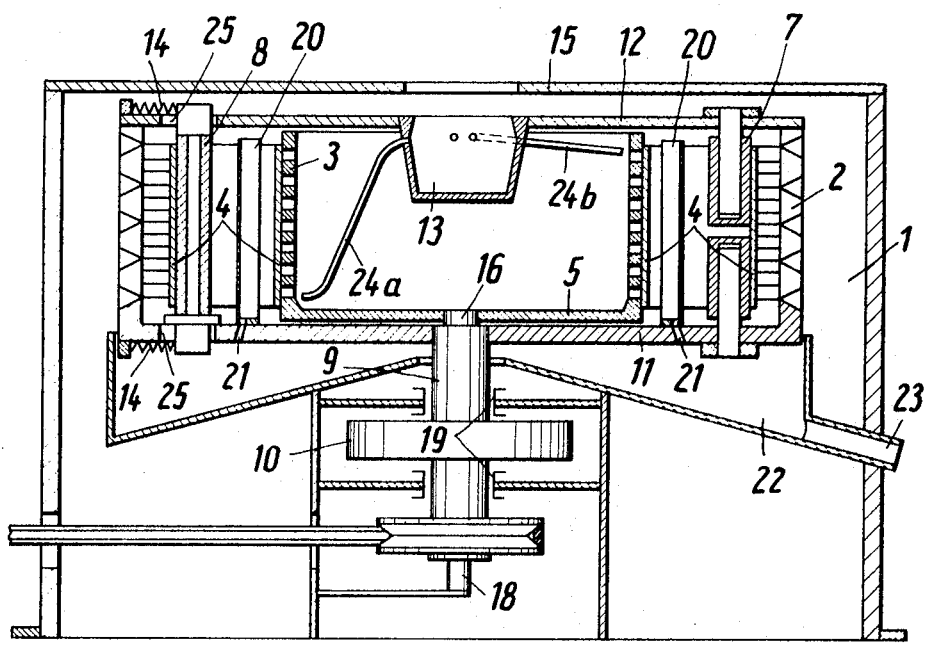

In the following, an examplatory embodiment of the invention is described by making reference to the drawings, wherein FIG. 1 shows a diagrammatical horizontal section through a filter belt centrifuge according to the invention, and FIG. 2 shows a diagrammatical vertical section through the filter belt centrifuge according to FIG. 1 along the line I—I.

According to the Figures, the filter bent centrifuge comprises a perforated roller cage 2 rotating within a stationary casing 1, which roller cage has centrically rotating therein with slightly different and preferably higher speed of rotation, a perforated driving drum 3 for the filter belts 4, 4, the driving drum 3 having an imperforate bottom 5. The roller cage 2 and the driving drum 3 are perforated so that no material to be filtered, and no filter cake, will collect on the material surfaces surrounding the apertures. To this end, the roller cage is preferably composed of angle iron profiles having their rear sides directed inwardly and preventing a very small restriction to movement of the filter cake which is thrown off. On the other hand, the driving drum 3 preferably is integral, and the apertures of the perforations are arranged such that the material to be filtered, which is held within the apertures by the filter belts 4, cannot accumulate at one point of the filter belt and that only a minor surface area, about 30 percent, of the filter belt is covered.

Between the driving drum 3 and the roller cage 2, there are disposed at least two oppositely arranged filter belts 4, 4 which are tensioned by means of deflection rollers 6, 6, guiding rollers 7, 7 and movable tensioning rollers 8, 8. The inner passes of the filter belts contact the driving drum 3 over almost their full length.

The roller cage 2 includes a securely attached bottom 11 mounted on an outer shaft 9 of a transmission 10, and a removable cover 12 having a central opening into which there is inserted a distribution pot or cylinder 13 which diverges conically in upward direction and which has an inwardly inclined upper rim. The tensioning rollers 8, 8 are radially movable in slots 25, 25 in roller cage bottom 11 and in the cover 12 of the roller cage and are resiliently urged in outward direction preferably by means of tension springs 14, 14. The slots 25, 25 serve to guide and position the axes of the tensioning rollers 8, 8 without impeding their radial movability.

The tensioning rollers 8, 8 are mounted on the axes by means of ball bearings, whereby the forces imposed by the centrifugal acceleration onto the tensioning rollers and the axes are carried directly by the filter belts.

The upper side of casing 1 is closed by a cover 15 having a central feed opening 15' the diameter of which corresponds approximately to the uppermost diameter of the distribution cylinder 13 which it overlies.

An inner shaft 16 passes centrally through the outer shaft 9, which inner shaft is rotatable relative to the outer shaft and which is fixedly connected to the bottom 5 of the driving drum 3.

The transmission 10 the outer casing 17 of which is driven by a suitable driving means (not illustrated), e.g., through a V-belt, in bearings 19, is known under the designation "Cyclo" transmission. By keeping the actual driving or input shaft 18 stationary, the transmission is capable of rotating the inner shaft 16 and thus the driving drum 3 at an adjustable higher speed of rotation that that of the outer shaft 9 and thus the roller cage 2. If the driving or input shaft 18 is driven with a certain speed, the differential speed between the shafts 9 and 16 can be adjusted in any desired manner, if necessary.

Of course, any other suitable transmission assembly may be used in place of the above-mentioned "Cyclo" transmission in order to drive the roller cage and the driving drum with a slight differential speed of rotation. A number of respective possibilities of solution are known to the expert.

In the interior of the filter belts 4, 4, there are rounded collector plates 20, 20 which diverge slightly conically in downward direction and which are attached to the bottom 11. The bottom 11 of the roller cage 2 includes downwardly directed bores 21, 21 which open within the extent of the collector plates 20, 20. The bore diameter has to be selected such that the cross-sectional area of these bores is sufficient to discharge the filtering liquid.

Beneath the roller cage 2 there is provided a collector space 22 connected to the casing 1 and having a outlet sleeve 23 for liquid removal. The bores 21, 21 open within the collector space 22 which is constructed so as to completely collect the filtering liquid splashing from the bores and which has a peripheral collar portion surrounding the lower portion of the roller cage 2.

The distribution cylinder 13 carries, in the region of its major diameter, over its entire periphery a series of tubes 24, wherein the tubes 24a are joined with their open ends in a vertical plane over 180° of the circumference, whereas the tubes 24b are joined at the opposite 180° of the circumference with their open ends in a second plane which is opposite to the first-mentioned plane and which extends vertically. The tubes 24, the inner ones of which are shown in broken lines, in this construction are bent in such manner that their projection on a horizontal plane always forms an angle greater than 90° with the radius of a circle intersecting them and positioned centrically to the distribution cylinder 13. Lacking this construction, the transport through these tubes is impeded or the tubes are unable fully to empty themselves under the action of the centrifugal force.

The filter belts 4, 4 per se may consist of a fabric of plastic material or metal or even of a non-woven and compacted fleece. Prior condition for the filter belt material is a sufficiently high strength, small pore or mesh size to permit complete separation between the filter cake and the filtering liquid, good flexibility, high wear-resistance and low stretching under load. There may be used e.g. belts made of a metallic fabric, glass silk or even plastic material yarns of small residual elongation, for example of polyester.

The belt tension may, for example, be 800 kilograms at a belt width of 22 centimeters. The charge may be 2.3 kilograms when using two belts. The speed of rotation of the roller cage may be 1,700 rpm at a centrifugal acceleration of 1,000 G's (1 G = acceleration of the earth). The driving drum may rotate at 1,735 rpm. The maximum feed of the filter belt centrifuge may amount to about 6,500 kg/hour.

The filter belt centrifuge of the present invention operates as follows:

The material to be filtered is fed, preferably by means of a metering pump, in exactly metered amounts through the feed opening 15' in cover 15 into the distribution cylinder 13 rotating with the roller cage 2; is brought to the angular velocity of the roller cage 2 within said distribution cylinder; moves under the action of the centrifugal force upwardly along the conical walls of the distribution cylinder 13 up to the major diameter thereof; passes at that point into the radially extending tubes 24 and is thrown by the latter in two vertical planes onto the filter belts 4, 4 in the direction of their path of rotation.

As the driving drum rotates at slightly higher speed than the roller cage 2, the filter belts 4, 4, which due to their forced tension are pressed against the driving drum 3, are moved in correspondence with the difference in the speeds of rotation.

The driving drum 3 preferably may be provided with a low wear-, and slip-, preventing coating at the outer side thereof; for example, it may be rubber coated.

The material to be filtered on the filter belts 4, 4 is carried by the latter within the apertures of the driving drum 3, whereby the filter cake is separated from the filtering liquid under the action of centrifugal force. The filtering liquid is thrown in front of the collector plates 20, 20 and through the bores 21, 21 into the collector space 22 whence the liquid may be removed through the sleeve 23.

At and behind the deflection rollers 6, 6 the filter cake is thrown from the filter belts 4, 4 onto the wall of the roller cage 2 and from the latter, through the openings therein, into the casing 1 from which latter the filter cake may be removed by conventional means (not illustrated) which are known to the expert and which may be provided according to his discretion.

The tensioning rollers 8, 8 are slidably mounted in slots 25, 25 which preferably have a length of several centimeters, and said rollers always maintain the filter belts 4, 4 under a certain tension due to the force exerted by the springs 14, 14. With the centrifuge rotating, the outwardly directed centrifugal force acts on the tensioning rollers 8, 8 too, which circumstance advantageously provides the necessary belt tension.

In addition to the centrifugal force, the tensioning rollers also may be tensioned by mechanical, electrical, electro-magnetical, pneumatic or hydraulic means. The tension exerted by such means then, aisde from the dependency on centrifugal force, may be controlled also in dependency of the loading of the filter belts.

The tension created in dependency of centrifugal force is particularly advantageous for the reason that lift-off of the inner pass of the filter belts 4, 4 from the driving drum 3, which must be avoided by all means, is likewise dependent on the effect of the centrifugal force on the loading of the inner belt pass with the material to be filtered.

If the inner belt pass lifted off from the driving drum, this would result in the filter belts becoming stationary and thus, after some time, in destruction of the filter belts. The tensioning pressure of the tensioning rollers 8, 8 e.g. 40 kilograms per centimeter of belt width, and the loading must be selected such that the fatigue limit of the belt is not exceeded and that the centrifugal force acting on the load on the inner belt pass does not result in lift-off of the filter belt or that the contact pressure does not become too small for movement of the belt, respectively.

Because of the great arc of belt wrap of the filter belts 4, 4 on the driving drum 3, a slip-free movement of the filter belts is ensured also in case of small contact pressures.

Limit switches provided at the slots 25, 25 may indicate unduly great movement of the tensioning rollers 8, 8 and thus too great an elongation of the belt, and render possible a switching off of the centrifuge before damage thereto occurs.

Upon removal of the casting cover 15, the cover of the roller cage 2 may be removed together with the upper portion of the, preferably split, deflection and guiding rollers 6, 6 and 7, 7, respectively, as well as with the distribution cylinder 13 including the feed tubes 24, 24, in order to permit ready replacement of the filter belts 4, 4.

The velocity of revolution of the filter belts may be adjusted in accordance with the respective material to be filtered by adjustment of the differential speeds of rotation of the driving drum 3 relative to the roller cage 2.

If necessary, means (not illustrated) may supply a washing or flushing liquid to the outer and/or inner belt passes, which liquid may be removed from the centrifuge separately.

I claim:
1. A filter belt centrifuge which comprises
   a casing;
   a foraminous rotatable roller cage disposed within said casing;
   feeding means delivering material to be filtered to the interior of said casing;
   a rotatable driving drum concentrically positioned within said roller cage, which rotatable driving drum is rotated at a speed of rotation different from that of said roller cage;
   at least two endless filter belts, running over means disposed adjacent said driving drum;
   said driving drum being perforate thereby providing apertures through which material to be filtered may pass and against which said filter belts are pressed from the exterior thereof;
   means tensioning said filter belts against said rotatable driving drum;
   driving means for said roller cage, driving drum and endless belts;
   distribution means for uniformly distributing material to be filtered from said delivery means onto the inner passes of said filter belts;
   collector plates for filtrate between inner and outer passes of said filter belts;
   removal means for removing collected filtrate from said casing; and
   means for removing from said casing filter cake thrown off from said filter belts.

2. The filter belt centrifuge defined in claim 1, wherein the means tensioning said filter belts are effective also in the event of variations of the length of said filter belts.

3. The filter belt centrifuge defined in claim 1, including means tensioning said filter belts in proportion to created centrifugal force.

4. The filter belt centrifuge defined in claim 1, including tensioning rollers acting on the inner surfaces of the outer belt passes in order to tension said belts.

5. The filter belt centrifuge defined in claim 4, wherein the tensioning rollers are movable in radial direction in slots, which tensioning rollers are subjected to an outwardly directed pressure by biasing means.

6. The filter belt centrifuge defined in claim 5, wherein said tensioning rollers are movable in outward direction under the action of centrifugal force.

7. The filter belt centrifuge defined in claim 5, wherein said tensioning rollers are movable in outward direction under the action of spring means.

8. The filter belt centrifuge defined in claim 4, wherein said tensioning rollers are actuated by electrical tensioning means.

9. The filter belt centrifuge defined in claim 1, wherein said feeding means comprises a distribution pot connected to said roller cage centrically to said driving drum, which distribution pot is open in upward direction and includes distribution means comprising distribution tubes so disposed as to uniformly distribute material to be filtered on to the width of the filter belts.

10 The filter belt centrifuge in claim 9, wherein said distribution means comprises a plurality of distribution tubes the inner ends of which are attached around the major diameter of said distribution pot and communicate with the interior of the latter, and the outer ends of which are arranged in vertical planes within said driving drum.

11. The filter belt centrifuge defined in claim 10, wherein the projection of said distribution tubes on a horizontal plane always forms an angle greater than 90° with the radius of a circle intersecting them and positioned centrally relative to said distribution cylinder.

* * * * *